(12) United States Patent
Jain et al.

(10) Patent No.: US 12,197,793 B2
(45) Date of Patent: Jan. 14, 2025

(54) SELF-CONSUMABLE PORTION GENERATION FROM A DIGITAL DOCUMENT

(71) Applicant: Adobe Inc., San Jose, CA (US)

(72) Inventors: Siddharth Kumar Jain, Bangalore (IN); Pratyush Kumar, Saket (IN); Naveen Prakash Goel, Noida (IN); Kazuhiro Toyoda, Cupertino, CA (US); Deepak Gilani, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/963,412

(22) Filed: Oct. 11, 2022

(65) Prior Publication Data

US 2024/0118842 A1    Apr. 11, 2024

(51) Int. Cl.
G06F 3/12      (2006.01)

(52) U.S. Cl.
CPC ............ G06F 3/1208 (2013.01); G06F 3/126 (2013.01); G06F 3/1285 (2013.01)

(58) Field of Classification Search
CPC ....... G06F 3/1208; G06F 3/126; G06F 3/1285
See application file for complete search history.

(56) References Cited

U.S. PATENT DOCUMENTS

| | | | | |
|---|---|---|---|---|
| 7,948,651 B2* | 5/2011 | Truong | ................... | G06K 15/02 |
| | | | | 358/1.6 |
| 8,125,671 B2* | 2/2012 | Seo | ....................... | G06F 3/1228 |
| | | | | 358/1.15 |
| 11,474,767 B1* | 10/2022 | Sait | ....................... | G06F 3/1268 |
| 2003/0204731 A1* | 10/2003 | Pochuev | ............... | H04L 9/3236 |
| | | | | 713/181 |
| 2005/0111045 A1* | 5/2005 | Imai | .................... | H04N 1/00222 |
| | | | | 358/1.18 |
| 2013/0155457 A1* | 6/2013 | Miura | .................... | G06F 3/1285 |
| | | | | 358/1.15 |
| 2015/0092237 A1* | 4/2015 | Kanamoto | ......... | H04N 1/00408 |
| | | | | 358/1.16 |
| 2017/0206043 A1* | 7/2017 | Boldt | .................... | G06F 3/1285 |
| 2017/0329863 A1* | 11/2017 | Metz | ..................... | G06F 40/134 |
| 2020/0272871 A1* | 8/2020 | Crampton | ........... | H03M 7/6005 |
| 2020/0311982 A1* | 10/2020 | Ogawa | .................. | H04N 19/86 |
| 2024/0242017 A1 | 7/2024 | Sethi | | |

OTHER PUBLICATIONS

Sethi, Jatin, "US Application as Filed", U.S. Appl. No. 18/098,658, filed Jan. 18, 2023, 44 pages.

* cited by examiner

*Primary Examiner* — Helen Zong

(74) *Attorney, Agent, or Firm* — FIG. 1 Patents

(57) ABSTRACT

Self-consumable portions generation techniques from a digital document are described. The self-consumable portions are generated based on a determination of an amount of resources available at a receiver device that is to receive the digital document. Examples of the resources include an amount of memory resources, processing resources, and/or network resources associated with the receiver device. The self-consumable portions, once generated, are separately renderable at the receiver device.

20 Claims, 6 Drawing Sheets

SELF-CONSUMABLE PORTION GENERATION FROM A DIGITAL DOCUMENT

BACKGROUND

Digital documents are consumable in a variety of different usage scenarios that include use of different device types, different types of operating systems that are executable by those devices, different types of applications that are executable via those operating systems, and so on. To address this, a portable document format was developed as a file format to present digital documents in a manner that is independent of these different usage scenarios. This functions to increase interoperability of digital documents that employ this format.

However, in real-world scenarios the amount of data included as part of the digital document continues to increase. This increase presents challenges in conventional usage scenarios which limit an ability to consume this document by devices and associated functionality that has not expanded to address this increase. Conventional techniques that are developed to address these challenges reduce visual quality and accuracy of the digital documents when rendered.

SUMMARY

Self-consumable portions generation techniques from a digital document are described. The self-consumable portions are generated based on a determination of an amount of resources available at a receiver device that is to receive the digital document. Examples of the resources include an amount of memory resources, processing resources, and/or network resources associated with the receiver device. The self-consumable portions, once generated, are separately renderable at the receiver device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
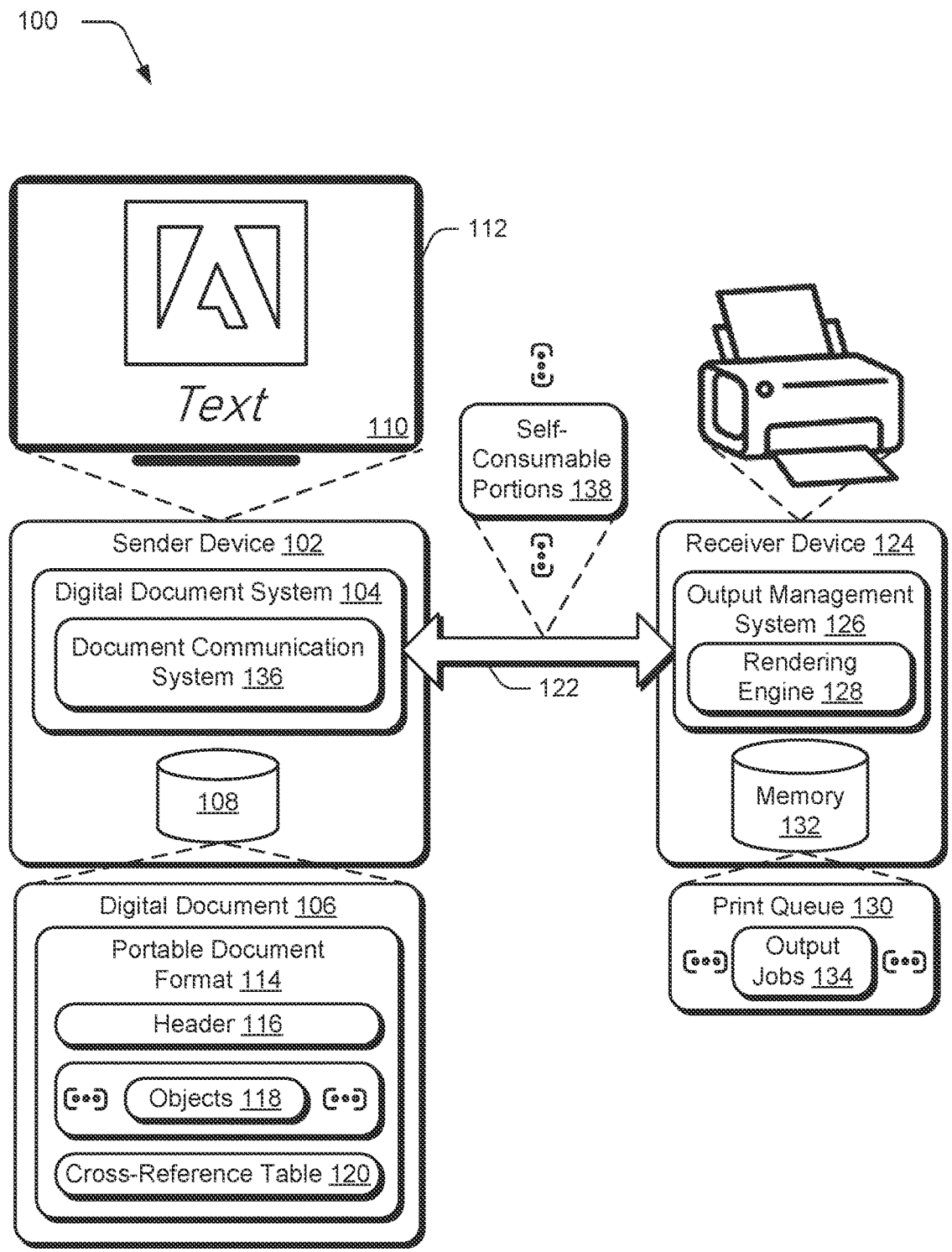
FIG. 1 is an illustration of an environment in an example implementation that is operable to employ self-consumable portion generation techniques from digital documents described herein.

Digital documents have adopted file formats to present digital documents in a manner that is independent of different usage scenarios. An example of this includes a portable document format that functions to increase digital document interoperability. A portable digital document format specifies a header, a plurality of objects, and a cross-reference table that specifies an offset (e.g., a byte offset) that is used to locate individual objects from the plurality of objects within the digital document.

In practice, however, the cross-reference table resides at the end of the digital document. Because of this, an entirety of the digital document is first obtained (e.g., stored to local memory), at which point the digital document is capable of being rendered. Consequently, usage scenarios having limited resources are incapable of processing digital documents that follow this format that do not have sufficient resources to store an entirety of the digital document together.

In one such example, a legacy printer having a limited amount of memory resources available to maintain a print queue is incapable of rendering digital documents "as is" that consume an amount of memory greater than that which is available in the print queue. Conventional techniques used to overcome these challenges are forced to forgo the advantages provided by this format, reduce visual quality and accuracy of the digital documents when rendered, and hinder device operation, e.g., due to resources consumed to reformat the digital document into a raster-based format.

Accordingly, techniques and systems are described for generating self-consumable portions from a digital document. The self-consumable portions are separately renderable by a receiver device and as such overcome challenges of conventional techniques and expand functionality to receiver devices that otherwise are incapable of rendering the digital document.

In one example, a digital document is received by a document communication system of a digital document system at a sender device. The digital document is formatted to include a header, a plurality of objects, and a cross-reference table that specifies an offset (e.g., a byte offset) that is used to locate individual objects from the plurality of objects. An example of this format is a portable document format as previously described.

The document communication system determines an amount of resources available at a receiver device that is to receive the digital document. The document communication system, for instance, determines an amount of memory associated with the receiver device, e.g., as part of a handshaking operation. This is performable to determine an amount of physical memory used by a print queue of the receiver device (e.g., overall), an amount that is available in the print queue (e.g., taking into account other output jobs), and so forth. In another instance, the amount of resources are based, at least in part, on an amount of bandwidth available via a communication channel between the devices. A variety of other instances are also contemplated, e.g., processing resources.

The document communication system then determines a communication size based on the resource amount as well as a document size of the digital document. Based on the communication size, the document communication system generates a plurality of self-consumable portions for streaming to the receiver device, and as such, overcomes conventional limitations and preserves digital document functionality.

The document communication system, for instance, determines a resource amount of "X" for the receiver device. In a printing scenario, the resource amount of "X" indicates an amount of memory space available in a print queue of the receiver device, e.g., overall, currently available, and so forth.

The document communication system then determines if a document size of the digital document is less than the resource amount of "X" for the receiver device. If so, the document communication system transmits the digital document in an unaltered form for receipt by the receiver device.

If not, the document communication system then determines whether a page size of the digital document is less than the resource amount of "X" for the receiver device. If so, the document communication system generates a plurality of self-contained portions for respective pages of the plurality of pages of the digital document. The self-contained portions, for instance, includes resources and hints sufficient for being rendered, individually, without consulting the cross-reference table. Each self-contained portion in this example is therefore renderable by the receiver device as received from the sending device (e.g., as streamed in real time), thereby improving device operation.

If the page size of the digital document is not less than the resource amount of "X" for the receiver device, the document communication system generates a plurality of self-contained portions for respective bands of a plurality of bands, e.g., as taken from a single document page. The bands, for instance, correspond to sequential portions taken along an axis, e.g., collections of horizontal rows along a vertical axis. The bands, as self-consumable portions, also include objects and hint sufficient for individually rendering by the computing device. Size of the bands is variable, which is usable to address differences in amount of data stored in respective portions of a page, e.g., text as opposed to digital images.

As a result, generation of the bands is also performable to dynamically adjust to respective amounts of data included in corresponding portions of the pages and digital document as a whole. In an implementation, this process continues, e.g., to form bands as raster objects as opposed to vector objects in a scenario in which the resource amount of "X" for the receiver device is less than an amount of the resource consumed by respective bands in a vector format. This process is configurable to dynamically adjust during runtime to address changes to the resource amount.

In this way, the plurality of self-consumable portions is configurable to support different amounts of resources, even within a single digital document, and yet maintain compliance with an original format of the digital document, e.g., in accordance with a portable document format. This functionality acts to preserve visual quality and device operation, further discussion of which is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a sender device 102, which is configurable in a variety of ways.

The sender device 102, for instance, is configurable as computing device, examples of which include a desktop computer, a laptop computer, a mobile device (e.g., assuming a handheld configuration such as a tablet or mobile phone), and so forth. Thus, the sender device 102 ranges from full resource devices with substantial memory and processor resources (e.g., personal computers, game consoles) to a low-resource device with limited memory and/or processing resources (e.g., mobile devices). Additionally, although a single sender device 102 is shown, the sender device 102 is also representative of a plurality of different devices, such as multiple servers utilized by a business to perform operations "over the cloud" as described in FIG. 6.

The sender device 102 is illustrated as including a digital document system 104. The digital document system 104 is implemented at least partially in hardware of the sender device 102 to process and transform a digital document 106, which is illustrated as maintained in a storage device 108 of the sender device 102. Such processing includes creation of the digital document 106, modification of the digital document 106, and rendering of the digital document 106 in a user interface 110 for output, e.g., by a display device 112. Although illustrated as implemented locally at the sender device 102, functionality of the digital content editing system 104 is also configurable as whole or part via functionality available via a network, such as part of a web service or "in the cloud."

The digital document 106 in this example is configured according to a portable document format 114 that specifies an arrangement of parts of the document within a file. In the illustrated example, the portable document format 114 includes a header 116, a plurality of objects 118 and a cross-reference table 120. The header 116, for instance, includes a "magic number" (e.g., incorporating file type metadata that uniquely identifies the file format) and an indication of a format version. In one example, the plurality of objects 118 are arranged according to a carousel object structure (COS) specifying a file tree. The objects 118 are configurable as Boolean values, real numbers, integers, strings, names, arrays, dictionaries, streams, null objects, and so forth. Object types include direct objects that are embedded in another object and indirect objects that are numbered with an object number and a generation number. Indirect objects are implemented in one example as object streams.

The cross-reference table 120 is located near the end of the file and specifies an offset of the objects 118 within the digital document 106. The cross-reference table 120, for instance, specifies a byte offset of each indirect object starting at a beginning of the digital document 106. This configuration supports efficient random access to the plurality of objects 118 within a file of the digital document 106. However, as previously described this format involves download of an entirety of the digital document 106 in order to obtain the cross-reference table 120 to then locate and render the objects 118.

The sender device 102, for instance, is communicatively coupled 122 (e.g., via a communication channel such as a network connection or local connection) with a receiver device 124 that is configured to process the digital document 106. In the illustrated example, the receiver device 124 is configured as a printer operable to print the digital document 106 onto a substrate, e.g., ink to paper. Other receiver device 124 configurations are also contemplated.

The receiver device 124 includes an output management system 126 having a rendering engine 128 that is configured to render the digital document 106 into an output buffer as a raster object (e.g., bitmap) that is then printed by a printing mechanism. As part of print management, a print queue 130 is maintained in memory 132 (e.g., physical memory) having output jobs 134 to be rendered.

As previously described, advances in technology and functionality of some types of receiver devices have not kept up with digital document advancements. This is often due to hardware costs, legacy designs, and so forth. In a printer scenario, for instance, a print queue included as part of a low-cost printer may not have a sufficient amount of space to store an entirety of a digital document in memory, sufficient amount of processing resources to render the digital document, and so forth.

Conventional techniques used to address this, while reducing a failure rate, involve increased amounts of data flow, reduction in visual quality, and defeat an underlying purpose of the portable document format 114 to provide rich content in an independent format. These challenges are compounded as an amount of functionality included in digital documents continues to example.

Accordingly, a document communication system 136 is employed by the digital document system 104 to generate self-consumable portions 138 of the digital document 106 that overcome these challenges. The self-consumable portions 138, for instance, are arranged in a printing order in which each description of a respective portion of the digital document 106 is self-contained. As a result, the receiver device 124 is able to begin rendering of the self-consumable portions 138 as received and delete those portions from memory 132 after rendering, thereby improving operation of the receiver device 124.

The self-consumable portions 138, for instance, are each configured to maintain respective headers, objects, and hint tables and as such are individually configured for rendering. This supports rendering by a legacy rendering engine 128 without change, and thus expands this functionality to a wide range of receiver device 124 types without modification of those devices. This also supports use in enhanced scenarios in which the self-consumable portions 138 are streamed, support added hints, and organization that is then leveraged by the receiver device 124. In this way, the self-consumable portions 138 support increased rendering efficiency in that the portions are rendered as received and make printing of the digital document 106 possible in low-resource scenarios that otherwise would not be possible, e.g., without a hard disk by the receiver device 124. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Self-Consumable Portion Generation

The following discussion describes generation techniques that are implementable utilizing the previously described systems and devices. Aspects of each of the procedures are implemented in hardware, firmware, software, or a combination thereof. Procedures are shown as a set of blocks that specify operations performed by one or more devices and are not necessarily limited to the orders shown for performing the operations by the respective blocks. In portions of the following discussion, reference will be made to FIGS. 1-5.

Figure 2:
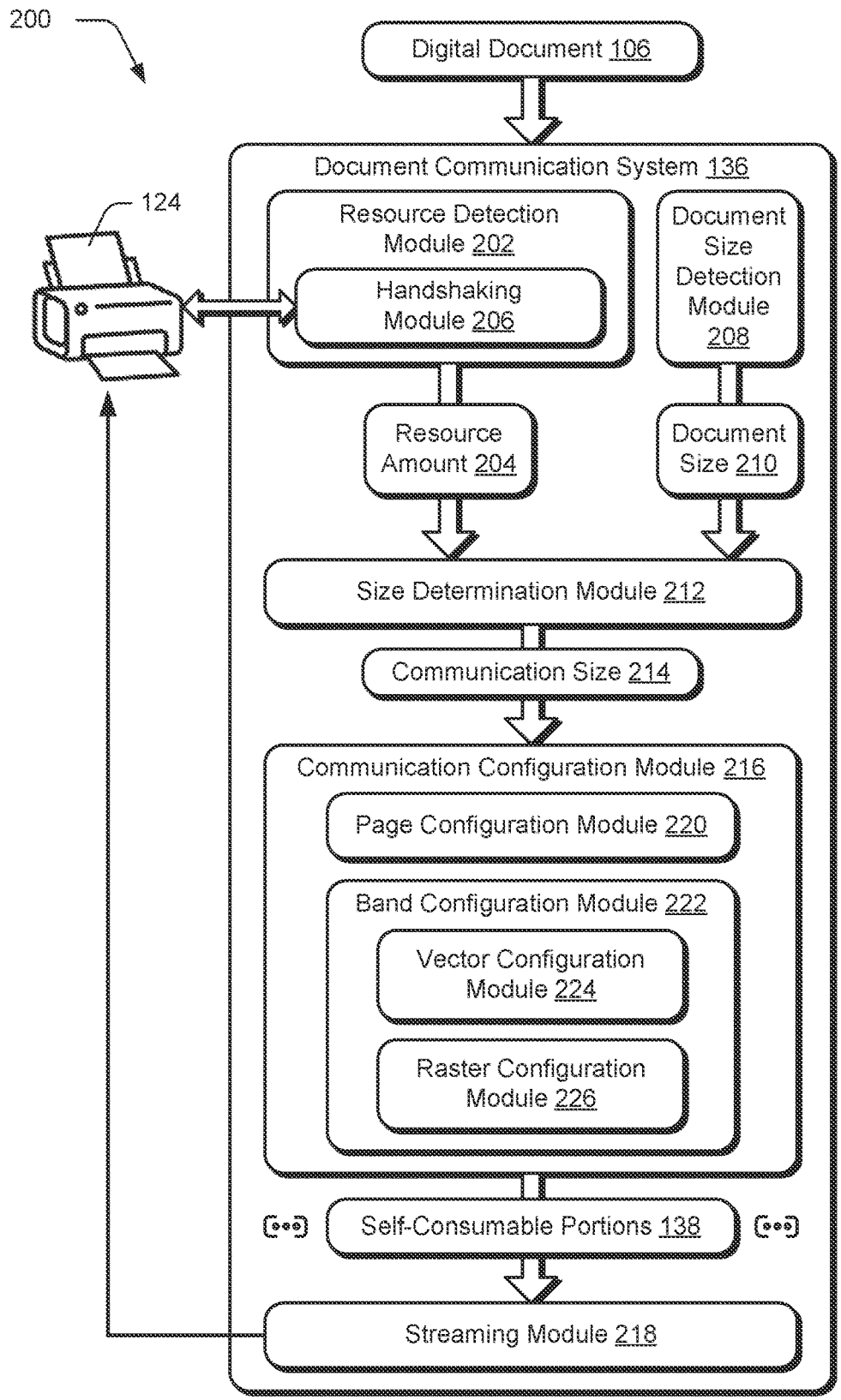
FIG. 2 depicts a system in an example implementation showing operation of a document communication system of FIG. 1 as generating self-consumable portions from a digital document that are streamed to a receiver device.
Figure 3:
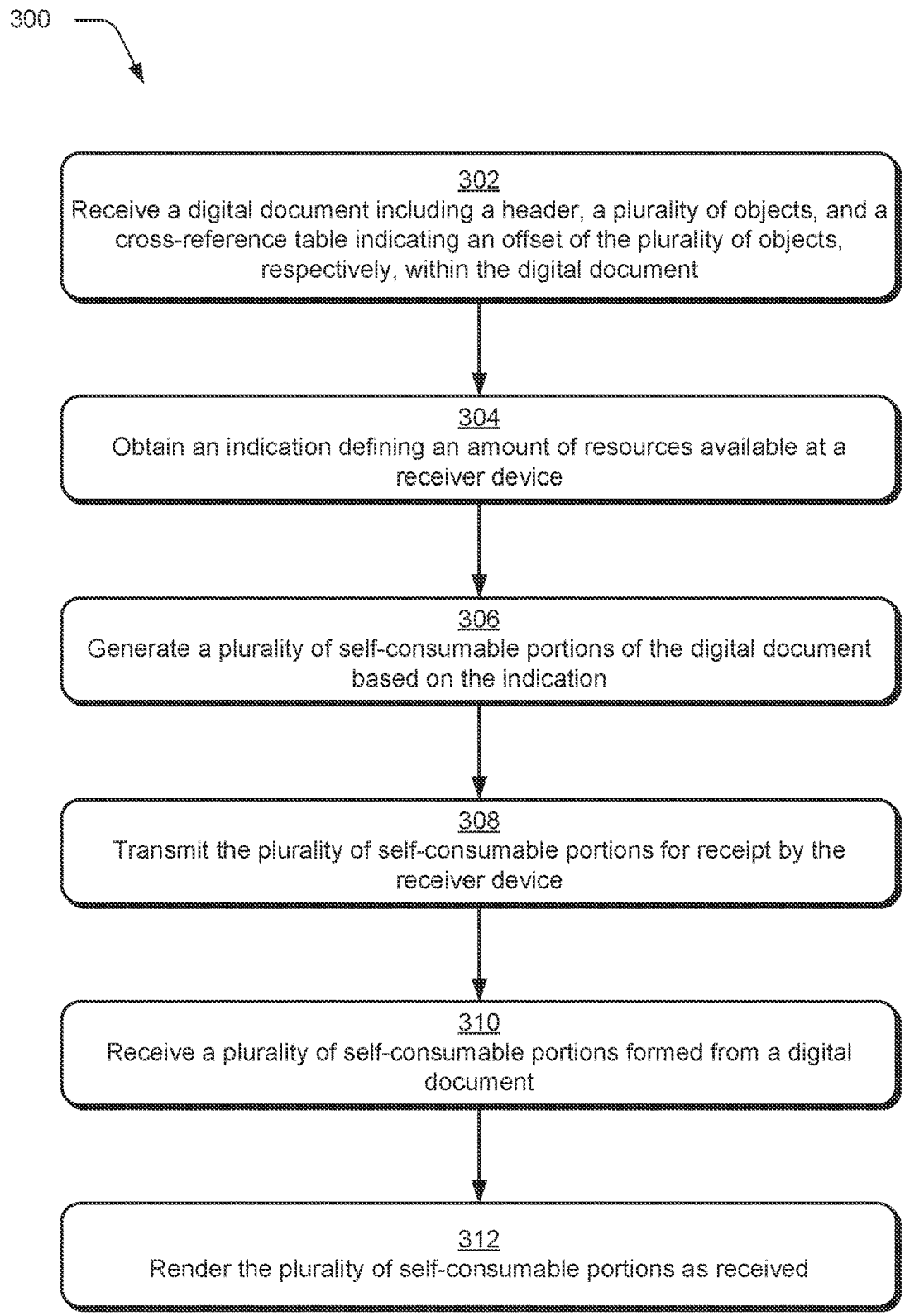
FIG. 3 is a flow diagram depicting a procedure in an example implementation of generation and transmission of self-consumable portions of a digital document by a sending device which are then rendered as received by a receiver device.

FIG. 2 depicts a system 200 in an example implementation showing operation of a document communication system 136 of FIG. 1 as generating self-consumable portions 138 from a digital document 106 that are streamed to a receiver device 124. FIG. 3 depicts a procedure 300 in an example implementation of generation and transmission of self-consumable portions 138 of a digital document 106 by a sending device 102 which are then rendered as received by a receiver device 124.

To begin in this example, a digital document 106 is received by the document communication system 136. The digital document 106 includes a header 116, a plurality of objects 118, and a cross-reference table 120 indicating an offset of the plurality of objects, respectively, within the digital document (block 302), e.g., in accordance with a portable document format 114. The digital document 106, for instance, is received by the document communication system 136 in response to a print request to print the digital document 106 using a receiver device 124.

A resource detection module 202 is then utilized to determine a resource amount 204 associated with the receiver device 124 that affects an ability to render the digital document 106. The resource amount 204, for instance, is determined as part of a handshaking protocol by a handshaking module 206. This is usable to determine an amount of memory resources, processing resources, network resources, and so forth.

In an example involving memory resources, the resource amount 204 indicates an amount of physical memory used by a print queue 130 of the receiver device 124, e.g., a total size of the queue. The resource amount 204 is also operable dynamically to indicate an amount of physical memory used by a print queue of the receiver device that is indicated as available, e.g., based on a state of other output jobs 134 maintained in the print queue 130. In an example involving network resources, the resource amount 204 indicates an amount of bandwidth available via a communication channel between the sender device 102 and the receiver device 124, communication conditions (e.g., noise), and so forth. In an example involving processing resources, the resource amount 204 indicates capabilities of processing resources of the receiver device 124 to render a digital document, e.g., an amount of data that is renderable by the processing device.

The document communication system 136 also includes a document size detection module 208 that is configured to detect a document size 210 of the digital document 106. This includes, in one example, detecting an overall size of the digital document 106, size of portions within the digital document (e.g., pages, objects, bands), and so forth.

An indication is then obtained by a size determination module 212 indicating an amount of resources (i.e., the resource amount 204) available at the receiver device 124 (block 304), e.g., to the sender device 102. In an implementation, the document size 210 is also obtained by the size determination module 212.

In this example, the digital document 106 is configured for rendering at the receiver device upon receipt of the plurality of objects 118 as well as the cross-reference table 120 indicating an offset of the plurality of objects 118, respectively, within the digital document 106. Accordingly, the digital document 106 as configured is incapable of being rendered at the receiver device 124 until receipt of the plurality of objects 118 as well as the cross-reference table 120 as previously described. Therefore, in an example in which the resource amount 204 is sufficient for transmission, storage, and/or processing of the document size 210 of the digital document 106, the communication size 214 is an entirety of the digital document 106 without change. Accordingly, the digital document 106 is communicated as a whole by the document communication system 136 in this example.

In an example in which the resource amount 204 is insufficient, however, the size determination module 212 determines a communication size 214 that is compatible with the receiver device 124. A communication configuration module 216 then generates a plurality of self-consumable portions 138 based on the indication (block 306) and more particularly the resource amount 204. The plurality of self-consumable portions is then transmitted by a streaming module 218 for receipt by the receiver devices 124 (block 308).

The communication configuration module 216 is configured to adjust a size of the self-consumable portions 138 based on the communication size 214 using a variety of levels of granularity. Illustrated examples of these levels are represented as a page configuration module 220 and a band configuration module 222. The band configuration module 22 further includes functionality to adjust band size, examples of which include a vector configuration module 224 and a raster configuration module 226. In this way, the communication configuration module 216 is configured to address a resource amount 204 associated with the receiver device 124 and document size 210 of the digital document 106 to preserve functionality available via the portable document format 114 to an extent supported by the receiver device 124.

Figure 4:
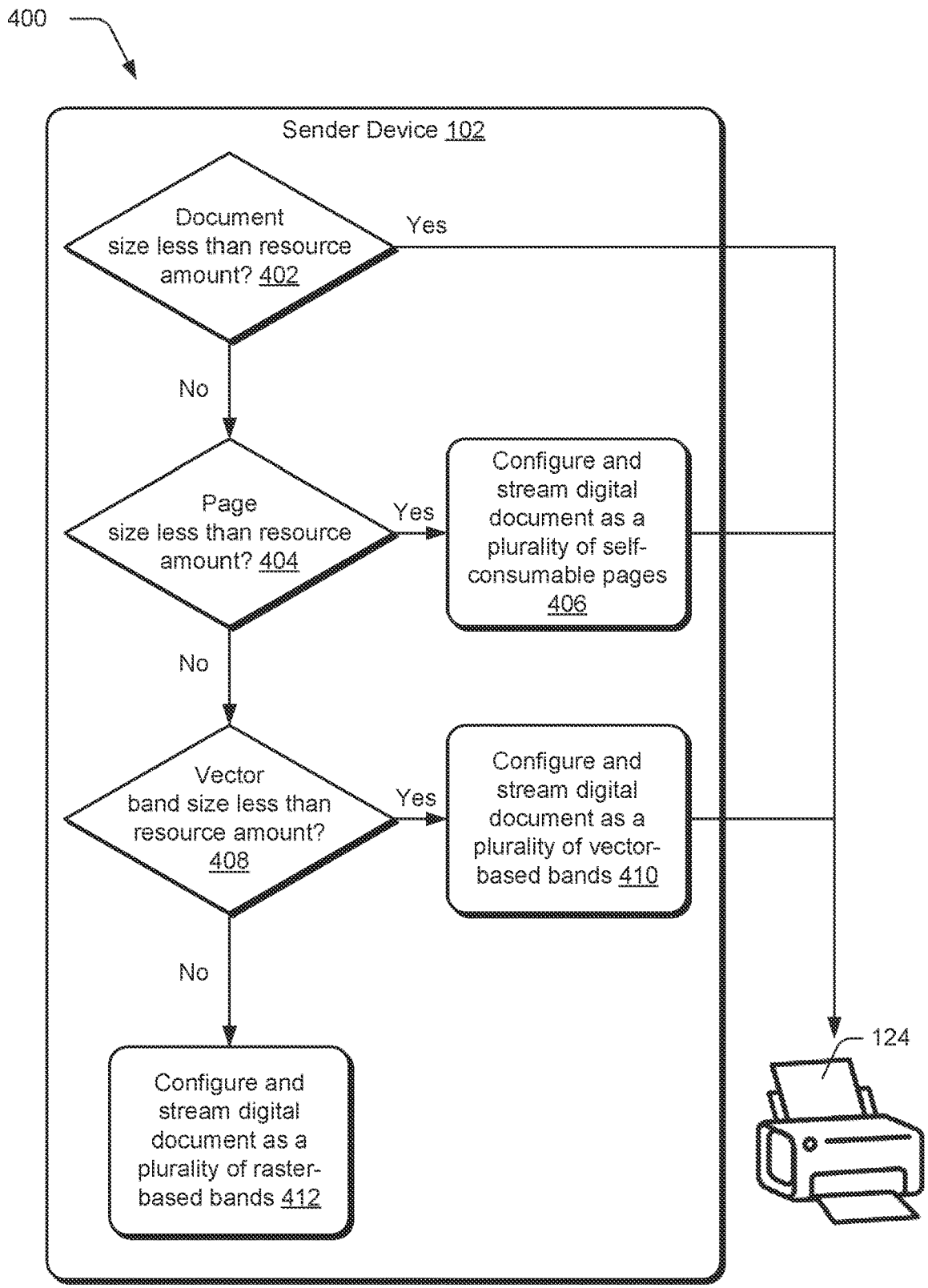
FIG. 4 depicts an example implementation showing operation of a size determination module and communication configuration module of the document communication system of FIG. 2 in greater detail.

FIG. 4 depicts an example implementation 400 showing operation of the size determination module 212 and communication configuration module 216 of the document communication system of FIG. 2 in greater detail. To begin, a determination is made by a size determination module 212 as to whether a document size 210 is less than a resource amount 204 (decision block 402). If so ("yes" from decision block 402), the digital document 106 is transmitted to the receiver device 124 in its entirety and without alteration. In this example, the receiver device 124 includes sufficient resources for processing the digital document 106 and therefore changes are not made to the document.

If the document size 210 is not less than a resource amount 204 ("no" from decision block 402), portions of the digital document digital document 106 are examined to determine which have a size that is compatible for processing by the receiver device 124. In a first example, a determination is made as to whether a page size of the digital document 106 (e.g., a current page) is less than the resource amount resource amount 204 (decision block 404). If so, ("yes" from decision block 404), the digital document 106 is configured and streamed as a plurality of self-consumable pages (block 406).

If the page size is greater than the resource amount 204 ("no" from decision block 404), a determination is made as to whether a vector band size of the digital document 106 (e.g., a current band) is less than the resource amount resource amount 204 (decision block 408). The bands, for instance, correspond to sequential portions taken along an axis, e.g., collections of horizontal rows along a vertical axis, collections of vertical rows along a horizontal axis, and so forth. The bands, as self-consumable portions 138.

If the vector band size is less than the resource amount 204 ("yes" from decision block 408), the digital document 106 is configured and streamed as a plurality of vector-based bands (block 410). If the vector band size is not less than the resource amount 204 ("no" from decision block 408), the digital document 106 is configured and streamed as a plurality of raster-based bands (block 412). Accordingly, the plurality of self-consumable portions 138, formed from the digital document 106, are received by the receiver device 124 (block 310) and rendered as received (block 312), e.g., in real time.

In these techniques, processing of the digital document 106 is performed such that different types of self-consumable portions 138 are streamed to the receiver device 124. For example, pages, bands, and so forth are configurable to consume different amounts of resources, e.g., text versus digital images. Accordingly, sizes of the self-consumable portions 138 are adjustable on a per-page and even per-band basis to reflect differences between pages within a digital document and differences between bands within a respective page.

Figure 5:
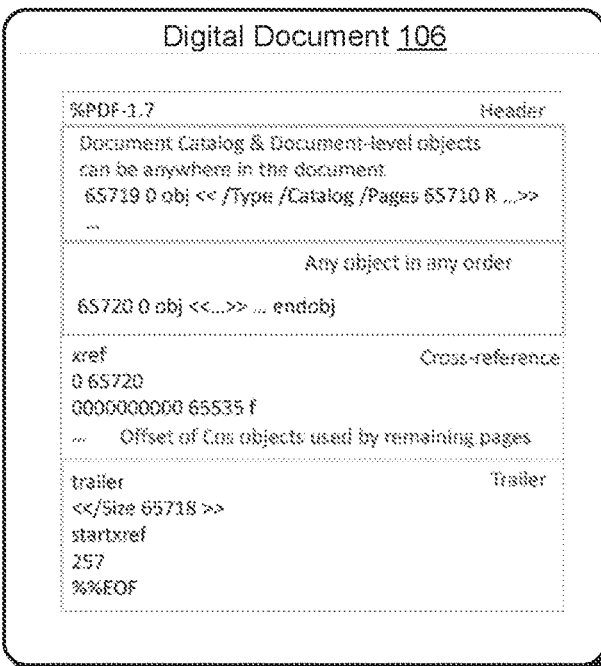
FIG. 5 depicts an example implementation showing a format of self-consumable portions generated by the document communication system of FIG. 2 based on a format of a digital document.
Figure 5:
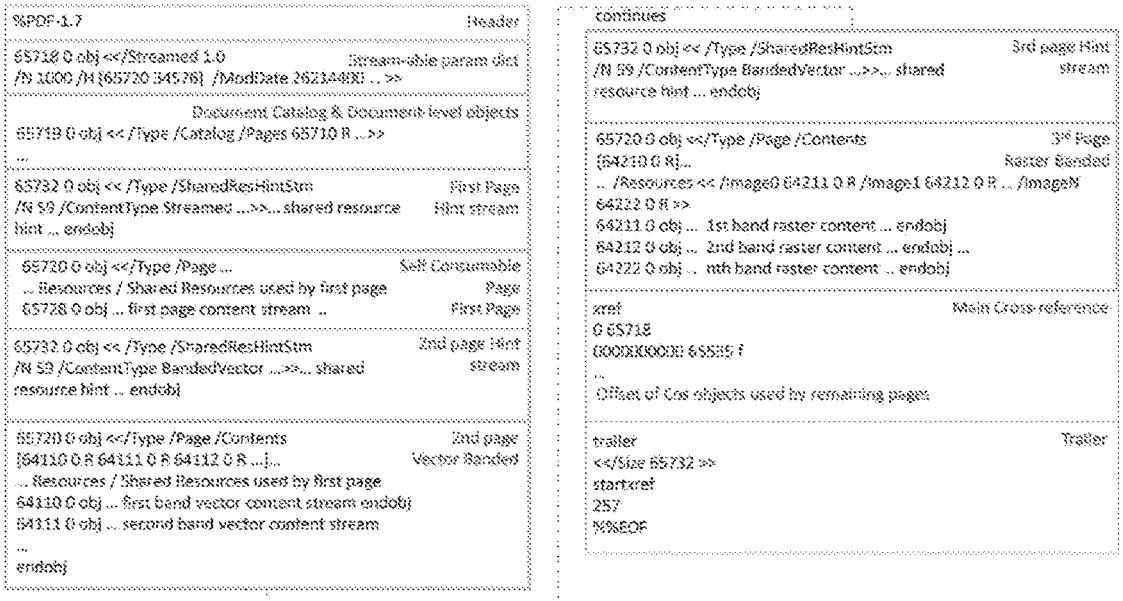

FIG. 5 depicts an example implementation 500 showing a format of self-consumable portions generated by the document communication system 136 of FIG. 2 based on a format of a digital document 106. The plurality of self-consumable portions 138 as generated from the digital document 106 collectively form a streamed digital document 502.

In an implementation example, indirect objects 118 in a file of the digital document 106 are numbered sequentially and occur in an order of printing. Pages are printed in an order of appearance in the digital document 106, e.g., object 118 corresponding to a first page occur first, followed by object 118 corresponding to a second page, and so on.

The streamed digital document 502 begins with a header line. Streaming is independent in this example of version number and is applicable to any file. "Binary characters" following the percent sign on the second line in the illustrated example are characters with codes of "128" or greater.

Following the header, a first object in a body of the streamed digital document 502 is implemented as an indirect dictionary object. This is a streaming parameter dictionary containing the parameters listed in the table below. Values in this dictionary are direct objects.

The streaming parameter dictionary is contained in this example within a first set of bytes of the streamed digital document 502. This limits the amount of data a printing application is to read before determining whether the file is streamed.

| Parameter | Type | Value |
| --- | --- | --- |
| Streamed | Number | Version identification for the streamed format. |
| N | Integer | The number of pages in the document. |
| H | Array | An array of two integers [offset1 length1]. The "offset1" is an offset of a first page shared resource hint stream from a beginning of the file. (This is the beginning of the stream object and not the stream data). The value "length1" is a length of a stream object, including stream object overhead. |
| ModDate | String | Specifies the signature of streamed digital document 502 creation date. This is used to check the integrity of a streamed parameter dictionary through comparison against "ModDate" in "DocInfo" dictionary. |

Following the streaming parameter dictionary are a catalog dictionary and other objects that are involved in opening the streamed digital document 502. These additional objects include the values of the following entries, if present, and are indirect objects:

A "ViewerPreferences" entry in the catalog.
A "Perms" entry in the catalog.
A "Metadata" entry in the catalog.
A "OutputIntents" entry in the catalog.
A "OCProperties" entry in the catalog.
An "Encrypt" entry in a first trailer dictionary.

Objects that are not utilized upon opening the streamed digital document 502 are not located here, e.g., are instead located at an end of the streamed digital document 502. This includes objects such as page tree nodes, document information dictionary, and definitions for named destinations in this example.

Streaming information is stored in "shared resource hint streams." This information enables a receiver device 124 to cache shared resources until a last reference to these resources in the streamed digital document 502 is encountered. The hint streams, when attached to a page, also contain information about a number of objects in the page.

The hint streams are not logically part of the information content of the streamed digital document 502 in this example, but rather are derived from the document. Actions that change the streamed digital document 502 (e.g., appending an incremental update) invalidate the hint streams. The streamed digital document 502 remains valid as a file in this instance but is no longer valid for streaming. Syntactically, a hint stream is implemented as an indirect object.

The location of a first shared resource hint stream is given in the streaming parameter dictionary at a beginning of a file of the streamed digital document 502. The shared resource hint stream of the first page is assigned an object number "1" in the streamed digital document 502 and has a cross-reference table entry in a main cross-reference table. Values of entries in the hint streams' dictionaries are direct objects and do not contain indirect object references.

Stream data in a shared resource hint stream includes the following:

"N" number integers, where each integer represents an object number (CosID) of a shared resource. The entry of a shared resource occurs in a shared resource hint stream of its first referenced page. "N=0" means "no shared resources are being used in this page" and "N=−1" means "no information is available about the shared resources."

"NRef" refers to a number of integers, where each integer represents an object number (CosID) of a shared resource which is not referenced after this page. This information is usable by the receiver device 124 for implementing efficient caching in a resource constrained environment. "NRef" number of integers occurs after the "N" integer in the stream.

The stream data contains "NRef" number of integers. In addition to standard stream attributes, the dictionary of the shared resource hint stream is configurable to include the following entries:

| Parameter | Type | Value |
| --- | --- | --- |
| Type | name | The type of object that this dictionary describes. |
| N | integer | Number of shared resource references in stream. "N = 0" means "no shared resources used in this page" and "N = −1" means information about the shared resources is not available. |
| E | integer | Byte offset of the end of the associated page relative to the beginning of a file, i.e., the streamed digital document 502. |
| O | integer | Object number of an associated page's "page object." |
| ObjStm | integer | If "object stream" (containing the compressed objects) is present in an associated page, then this entry contains an object number of the "object stream." |
| NRef | integer | Number of resource references in stream which are not referenced after this page. |
| ContentType | Name | The type of page, e.g., its value is one of "Streamed," "BandedVector," "BandedRaster" |

Other objects are includable as part of the document that are not directly involved in rendering pages, examples of which include:

Page tree.
Outline hierarchy.
Thread information dictionaries.
"PageMode" entry in the catalog.
"OpenAction" entry in the catalog.
"Named destinations" which are objects that include the value of a "Dests" or "Names" entry in a document catalog and each of the destination objects referenced by the objects.
The document information dictionary and the objects contained within.
The interactive form field hierarchy and the objects contained within.
Use of compressed stream is prohibited in this format for any object.

Because there is an "X" amount of resources (e.g., to store print data), scenarios can occur in which the streamed digital document 502 cannot be processed by the receiver device 124 because of a shared object. To address this, a "NRef" entry is added in this example to remove shared objects once stream size is greater than the "X" amount of resources.

As described in relation to FIG. 2, the band configuration module 222 includes a raster configuration module 226 configured to form the bands as raster objects. This functionality is applicable, for instance, in a scenario in which a single page's worth of data is not compatible with an "X" resource amount 204.

To do so, content of pages of the digital document 106 is configured into a plurality of bands. Each band in this example is analogous to a rectangular region having a height which is a fraction of overall page height and width set as a width of the page. In order to generate the bands, content (associated with objects 118) which lies beyond a band boundary is modified for inclusion within the band boundary. As a result, the receiver device 124 is configured to render a band's worth of data and generate an output without interpreting a complete page of the digital document 106. A variety of other examples are also contemplated.

In this way, the plurality of self-consumable portions is configurable to support different amounts of resources, even within a single digital document, and yet maintain compliance with an original format of the digital document, e.g., in accordance with a portable document format. This functionality acts to preserve visual quality and device operation.

Example System and Device

Figure 6:
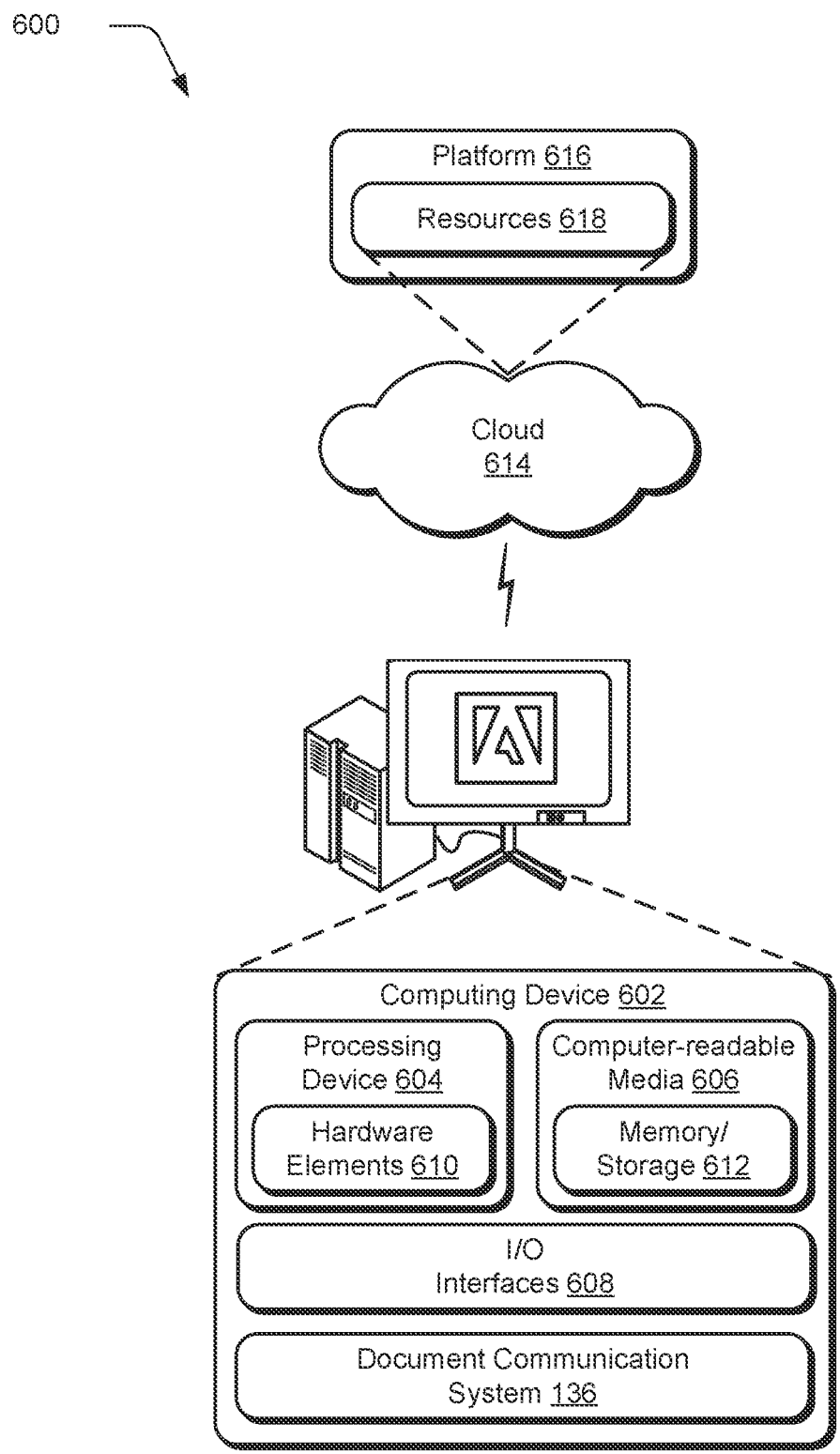
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that implement the various techniques described herein. This is illustrated through inclusion of the document communication system 136. The computing device 602 is configurable, for example, as a server of a service provider, a device associated with a client (e.g., a client device), an on-chip system, and/or any other suitable computing device or computing system.

The example computing device 602 as illustrated includes a processing device 604, one or more computer-readable media 606, and one or more I/O interface 608 that are communicatively coupled, one to another. Although not shown, the computing device 602 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 604 is representative of functionality to perform one or more operations using hardware. Accordingly, the processing device 604 is illustrated as including hardware element 610 that is configurable as processors, functional blocks, and so forth. This includes implementation in hardware as an application specific integrated circuit or other logic device formed using one or more semiconductors. The hardware elements 610 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 606 is illustrated as including memory/storage 612 that stores instructions that are executable to cause the processing device to perform operations. The memory/storage 612 represents memory/storage capacity associated with one or more computer-readable media. The memory/storage 612 includes volatile media (such as random access memory (RAM)) and/or nonvolatile media (such as read only memory (ROM), Flash memory, optical disks, magnetic disks, and so forth). The memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 602. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 610. The computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing device 604. The instructions and/or functions are executable/operable by one or more articles of manufacture (for example, one or more computing devices 602 and/or processing devices 604) to implement techniques, modules, and examples described herein.

The techniques described herein are supported by various configurations of the computing device 602 and are not limited to the specific examples of the techniques described herein. This functionality is also implementable all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data that can be utilized while computer processing is executed on servers that are remote from the computing device 602. Resources 618 can also include services provided over the Internet and/or through a subscriber network, such as a cellular or Wi-Fi network.

The platform 616 abstracts resources and functions to connect the computing device 602 with other computing devices. The platform 616 also serves to abstract scaling of resources to provide a corresponding level of scale to encountered demand for the resources 618 that are implemented via the platform 616. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

In implementations, the platform 616 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
   receiving, by the processing device, a digital document including a header, a plurality of objects, a streaming parameter dictionary between the header and the plurality of objects, and a cross-reference table indicating an offset of the plurality of objects, respectively, within the digital document;
   obtaining, by the processing device, an indication defining an amount of resources available at a receiver device;
   generating, by the processing device, a plurality of self-consumable portions of the digital document based on the indication, the streaming parameter dictionary including parameters identifying the plurality of self-consumable portions as formatted for streaming; and
   transmitting, by the processing device, the plurality of self-consumable portions for receipt by the receiver device, where each said self-consumable portion is separately renderable at the receiver device independent of the cross-reference table.

2. The method as described in claim 1, wherein the obtaining is performed as part of a handshaking operation between the processing device and the receiver device, the offset is a byte offset, and the digital document is formatted in a portable document format.

3. The method as described in claim 1, wherein the amount indicates an amount of physical memory used by a print queue of the receiver device.

4. The method as described in claim 1, wherein the amount indicates the amount of physical memory used by a print queue of the receiver device that is indicated as available to the processing device.

5. The method as described in claim 1, wherein the plurality of self-consumable portions is configured for rendering, individually, at the receiver device.

6. The method as described in claim 1, wherein the digital document is configured for rendering upon receipt of the plurality of objects as well as the cross-reference table indicating an offset of the plurality of objects, respectively, within the digital document.

7. The method as described in claim 1, wherein the digital document is configured as incapable of being rendered until receipt of the cross-reference table.

8. The method as described in claim 1, wherein the transmitting includes streaming the plurality of self-consumable portions over a network.

9. The method as described in claim 1, wherein the receiver device is a printer.

10. The method as described in claim 1, wherein the plurality of self-consumable portions corresponds, respectively, to a plurality of pages from the digital document.

11. The method as described in claim 1, wherein the plurality of self-consumable portions corresponds to a plurality of bands generated from a single page of the digital document.

12. The method as described in claim 1, wherein generating includes generating the plurality of self-consumable portions as vector objects from the digital document.

13. The method as described in claim 1, wherein generating includes generating the plurality of self-consumable portions as raster objects from the digital document.

14. A sender device comprising:
a size determination module implemented by a processing device to determine a size for use in generating a plurality of self-consumable portions from a digital document;
a communication configuration module implemented by the processing device to generate the plurality of self-consumable portions from the digital document, the digital document including a header, a plurality of objects, a streaming parameter dictionary between the header and the plurality of objects, and a cross-reference table indicating an offset of the plurality of objects, respectively, within the digital document, where the streaming parameter dictionary includes parameters identifying the plurality of self-consumable portions as formatted for streaming; and
a streaming module implemented by the processing device to stream the plurality of self-consumable portions to a receiver device, where each self-consumable portion is separately renderable at the receiver device independent of the cross-reference table.

15. The sender device of claim 14, wherein the size determination module is configured to determine the size based on an indication of an amount of resources available in memory at the receiver device.

16. The sender device of claim 14, wherein the size determination module is configured to determine the size based on an amount of bandwidth available via a communication channel with the receiver device.

17. The sender device as described in claim 14, wherein:
the plurality of self-consumable portions is configured for rendering, individually, at the receiver device; and
the plurality of objects of the digital document is not configured for rendering at the receiver device until receipt of the cross-reference table at the receiver device.

18. One-or-more non-transitory computer-readable storage media storing instructions that, responsive to execution by a processing device, causes the processing device to perform operations including:
receiving a plurality of self-consumable portions formed from a digital document, the digital document compatible with a portable document format including a header, a plurality of objects, and a cross-reference table indicating an offset of the plurality of objects, respectively, within the digital document; and
rendering the plurality of self-consumable portions in order as the plurality of self-consumable portions are received, and, for each rendered self-consumable portion, deleting the rendered self-consumable portion prior to rendering a next self-consumable portion in the order.

19. The one-or-more non-transitory computer-readable storage media as described in claim 18, wherein the plurality of self-consumable portions corresponds, respectively, to a plurality of pages from the digital document.

20. The one-or-more non-transitory computer-readable storage media as described in claim 18, wherein the plurality of self-consumable portions corresponds to a plurality of bands generated from a single page of the digital document.

* * * * *